(12) United States Patent
Saitoh et al.

(10) Patent No.: US 12,521,362 B2
(45) Date of Patent: Jan. 13, 2026

(54) AGENT FOR TREATING, PREVENTING, OR IMPROVING PSYCHIATRIC AND NERVOUS SYSTEM DISORDERS OR SYMPTOMS

(71) Applicant: TOKYO UNIVERSITY OF SCIENCE FOUNDATION, Tokyo (JP)

(72) Inventors: Akiyoshi Saitoh, Tokyo (JP); Yuya Terashima, Tokyo (JP); Kouji Matsushima, Tokyo (JP); Yoshitake Sano, Tokyo (JP)

(73) Assignee: TOKYO UNIVERSITY OF SCIENCE FOUNDATION, Tokyo (JP)

( * ) Notice: Subject to any disclaimer, the term of this patent is extended or adjusted under 35 U.S.C. 154(b) by 260 days.

(21) Appl. No.: 17/629,457

(22) PCT Filed: Sep. 25, 2020

(86) PCT No.: PCT/JP2020/036336
§ 371 (c)(1),
(2) Date: Jan. 24, 2022

(87) PCT Pub. No.: WO2021/015300
PCT Pub. Date: Jan. 28, 2021

(65) Prior Publication Data
US 2022/0313647 A1 Oct. 6, 2022

(30) Foreign Application Priority Data
Jul. 25, 2019 (JP) .................................. 2019-136756

(51) Int. Cl.
| | | |
|---|---|---|
| A61K 31/27 | (2006.01) | |
| A61K 31/145 | (2006.01) | |
| A61P 25/24 | (2006.01) | |
| A61P 25/28 | (2006.01) | |

(52) U.S. Cl.
CPC ............ *A61K 31/27* (2013.01); *A61K 31/145* (2013.01); *A61P 25/24* (2018.01); *A61P 25/28* (2018.01)

(58) Field of Classification Search
CPC ....... A61K 31/27; A61K 31/145; A61P 25/28; A61P 25/24
See application file for complete search history.

(56) References Cited

U.S. PATENT DOCUMENTS
2021/0220320 A1   7/2021 Terashima et al.

FOREIGN PATENT DOCUMENTS
| CN | 110917182 A | 3/2020 |
|---|---|---|
| JP | 2013-100268 A | 5/2013 |
| JP | 2013-534256 A | 9/2013 |
| WO | WO 2008/115706 A1 | 9/2008 |
| WO | WO 2016/111307 A1 | 7/2016 |
| WO | WO-2017100623 A1 * | 6/2017 ........... A61K 31/145 |
| WO | WO 2019/151409 A1 | 8/2019 |

OTHER PUBLICATIONS

Petrakis, I. L., et al. Biological psychiatry 57.10 (2005): 1128-1137. (Year: 2005).*
Chen, J.H., et al. Journal of the Formosan Medical Association 108.10 (2009): 754-764. (Year: 2009).*
"Cognitive Processing Therapy vs. Sertraline for the Treatment of PTSD & SUD in Egyptian Patients," ClinicalTrials.gov, Mar. 2018, retrieved from https://clinicaltrials.gov/ct2/show/study/NCT03469128, 12 pages total.
"Disulfiram as a Modulator of Amyloid Precursor Protein-processing (DIMAP)," ClinicalTrials.gov, Jul. 2017, retrieved from https://clinicaltrialsl.gov/ct2/show/NCT03212599, 11 pages total.
"The package insert for 'NOCBIN Powder'," Revised Apr. 2015, 10th Edition, Authorization No. 22000AMX02130, pp. 1-2, (3 pages total) with partial English translation,.
Auriol et al., "Control Experiment in Man on the Sedative Effect of Disulfiram, an Inhibitor of Dopamine-B-Hydroxylase," Biological Psychiatry, vol. 15, No. 4, 1980, pp. 623-625.
Cen et al., "Disulfiram Induces Apoptosis in Human Melanoma cells: a Redox-related Process." Molecular Cancer Therapeutics, vol. 1, Jan. 2002, pp. 197-204.
Chen et al., "Disulfiram, a Clinically Used Anti-Alcoholism Drug and Copper-Binding Agent, Induces Apoptotic Cell Death in Breast Cancer Cultures and Xenografts via Inhibition of the Proteasome Activity," Cancer Research, vol. 66, No. 21, Nov. 1, 2006, pp. 10425-10433.
Gjessing, Effect of Thyroxine, Pyridoxine, Orphenadrine-HCI, Reserpine and Disulfiram in Periodic Catatonia, Acta Psychiatrica Scandinavica, vol. 43, Issue 4, Dec. 1967, pp. 376-384 (12 pages total).
Gjessing, "The switch mechanism in periodic catatonia and manic-depressive disorder," Chronobiologia, vol. 2, No. 4, Oct.-Dec. 1975, 1 page total, abstract provided only.
Iijin et al., "High-Throughput Cell-Based Screening of 4910 Known Drugs and Drug-like Small Molecules Identifies Disulfiram as an Inhibitor of Prostate Cancer Cell Growth," Clinical Cancer Research, vol. 15, No. 19, Oct. 1, 2009, pp. 6070-6078.
Mohapatra et al., "Disulfiram induced Psychosis," Clinical Psychopharmacology and Neuroscience, vol. 15, No. 1. 2017, pp. 68-69.
Petrakis et al., "Naltrexone and Disulfiram in Patients with Alcohol Dependence and Comorbid Post-Traumatic Stress Disorder," Biol Psychiatry, vol. 60, 2006, pp. 777-783.
Quail et al., "Disulfiram Psychosis," South African Medical Journal, vol. 57, Apr. 5, 1980, pp. 551-552.

(Continued)

*Primary Examiner* — Kamal A Saeed
*Assistant Examiner* — Qincy Mckoy
(74) *Attorney, Agent, or Firm* — Birch, Stewart, Kolasch & Birch, LLP

(57) ABSTRACT

Disclosed is a novel measure that is effective in therapy etc. of psychiatric or neurological disorders or symptoms, such as anxiety or depressive disorders, and is unlikely to cause problems such as dependence and adverse effects and is highly safe. The present invention provides an agent for treating, preventing, or ameliorating psychiatric or neurological disorders or symptoms, wherein the agent contains any of the followings as an active ingredient: (1) disulfiram, (2) a metal complex of diethyldithiocarbamate, (3) a disulfide capable of generating diethyldithiocarbamate in the body, (4) a pharmaceutically acceptable salt of (1), (2), or (3), and (5) a solvate of (1), (2), (3), or (4).

12 Claims, 5 Drawing Sheets

(56) References Cited

OTHER PUBLICATIONS

Sherif et al., "Psychosis and enuresis during disulfiram therapy," Indian J. Psychiatry, vol. 48, No. 1, Jan.-Mar. 2006, pp. 62-63 (3 pages total).

Takahashi et al., "Studies of Periodic Catatonia-IV. Longitudinal Study of Catecholamine Metabolism, with and without Drugs," J. Psychiat. Res., vol. 9, 1972 (Revised Feb. 14, 1972), pp. 293-314.

Takao et al., "Prospects for subtype classification of depression—2 Clinical for alcohol-induced mood disorder," Japanese Journal of Clinical Psychiatry, vol. 42, No. 8, 2013, pp. 1027-1034 (10 pages total), with partial English translation.

"DSM-5 Table of Contents", American Psychiatric Association, Jan. 1, 2013, pp. 1-9, XP055952849, https://www.psychiatry.org/File%20Library/Psychiatrists/Practice/DSM/APA_DSM-5-Contents.pdf.

Kupfer, "Anxiety and DSM-5", Dialogues in Clinical Neuroscience, vol. 17, No. 3, Sep. 30, 2015, pp. 245-246, XP055952507, https://www.ncbi.nlm.nih.gov/pmc/articles/PMC4610609/pdf/.

Partial Supplementary European Search Report for European Application No. 20844253.3, dated Aug. 30, 2022.

Petrakis et al., "Naltrexone and Disulfiram in Patients with Alcohol Dependence and Comorbid Psychiatric Disorders", Biological Psychiatry, Elsevier, Amsterdam, NL, vol. 57, No. 10, May 15, 2005, pp. 1128-1137.

Schank et al., "Norepinephrine Signaling Through β-Adrenergic Receptors is Critical for Expression of Cocaine-Induced Anxiety", Biological Psychiatry, Elsevier, Amsterdam, NL , vol. 63, No. 11, Jun. 1, 2008, pp. 1007-1012.

Yi, "Effects of the NLRP3 Inflammasome on Depressive-like Behavior and its Molecular Mechanism," Chinese Doctoral Dissertations Full-text Database, Feb. 15, 2017, p. 4 [Doctoral Dissertation], 4 pages total.

Zheng et al., "Update on immune and metabolic dysregulation in major depressive disorder and the implications for drug intervention," Acta Pharmaceutica Sinica, vol. 52, No. 1, 2017, pp. 19-25, with an English translation.

\* cited by examiner

AGENT FOR TREATING, PREVENTING, OR IMPROVING PSYCHIATRIC AND NERVOUS SYSTEM DISORDERS OR SYMPTOMS

TECHNICAL FIELD

The present invention relates to an agent for treating, preventing, or ameliorating psychiatric or neurological disorders or symptoms.

BACKGROUND ART

Anxiolytic or antidepressant drugs are often used in the treatment of mental conditions related to anxiety disorder, depressive disorder, and the like. Various anxiolytic and antidepressant drugs that cause less dependence and produce less adverse effects have been developed, so that those drugs can be prescribed for chronic administration. However, the issues of dependence and adverse effects remain to be a major problem of anxiolytic and antidepressant drugs.

Disulfiram has an aldehyde dehydrogenase-inhibiting activity, and inhibits ethanol metabolism in the liver to cause accumulation of acetaldehyde in the body, which is responsible for hangover symptoms. Thus, after taking disulfiram, hangover symptoms occur even with a small amount of alcohol. By utilizing this action, disulfiram is used as an anti-alcoholism drug for treatment of chronic alcoholism. In addition to this action, disulfiram is known to exhibit anti-cancer effects by its action to induce death of cancer cells or cancer stem cells per se (for example, Non-Patent Documents 1 to 3 and Patent Document 1), and further known to exhibit anticancer and anti-inflammatory effects by controlling cells which constitute cancer and inflammatory microenvironments (Patent Document 2).

However, the effects of disulfiram to treat, prevent, or ameliorate psychiatric or neurological symptoms, such as anxiety and depressive symptoms, have not been known at all. Rather, disulfiram has been reported to cause mental disorders such as anxiety (Non-Patent Documents 4 to 6). The package insert (Non-Patent Document 7) for the anti-alcoholism drug "NOCBIN," which contains disulfiram as an active ingredient, describes depression, emotional lability, hallucination, derangement, delirium or similar symptoms (sometimes caused by alcohol abstinence), headache, dizziness, tinnitus, sleepiness, and sleep disorders as adverse effects on neuropsychological functioning, and does not at all describe effects of disulfiram to treat, prevent, or ameliorate psychiatric or neurological symptoms such as anxiety, depression, and sleep disorders.

Patent Document 3 describes use of disulfiram for treatment of mild cognitive impairment (MCI) and Alzheimer's disease. However, according to the data described in the examples, disulfiram was found to promote secretion of sAPPα from wild-type APP-transfected cells in an in vitro experiment using the cultured cells, but a brain uptake analysis using mice revealed that the blood-brain barrier permeability of disulfiram was very low, and the experimental results of measurement of changes in Alzheimer's disease-specific biomarkers in drug-treated Alzheimer's model mice are shown only for chemicals other than disulfiram. Thus, the therapeutic or prophylactic effects of disulfiram on MCI and Alzheimer's disease are not disclosed in Patent Document 3.

In the ClinicalTrials.gov database (https://clinicaltrials.gov/), which is a database containing information about clinical studies, a clinical trial is registered under the ClinicalTrials.gov Identifier NCT03469128 (Non-Patent Document 11), in which disulfiram is administered to patients with combined post-traumatic stress disorder (PTSD) and substance use disorder (SUD). Though the latest update is dated Mar. 19, 2018 and the recruitment status is categorized as "Completed," the database includes no results from the clinical trial and no disclosure indicating any significant effects observed in the disulfiram-dosed group. Additionally, a study is registered under the ClinicalTrials.gov Identifier NCT03212599 (Non-Patent Document 12), in which blood samples collected from alcoholic patients before administration of disulfiram and two weeks after the administration are used to examine ADAM10 expression by real-time RT-PCR. The study description identified by NCT03212599 describes that ADAM10 is a promising target for amyloid β peptide preventing strategy and that a known increase in expression of ADAM10 in human neuronal cells treated with disulfiram indicates a neuroprotective potential of disulfiram. However, the latest update of this study is dated Jul. 24, 2017 and the recruitment status is categorized as "Completed," but the database includes no results from the study and no disclosure indicating any significant increase in expressed ADAM10 in blood by the administration of disulfiram.

PRIOR ART DOCUMENTS

Patent Documents

Patent Document 1: JP 2013-100268 A
Patent Document 2: WO 2016/111307
Patent Document 3: JP 2013-534256 A Non-Patent Documents Non-Patent Document 1: Cancer Research, Vol. 66, pp. 10425-10433 (2006)
Non-Patent Document 2: Clinical Cancer Research, Vol. 15, pp. 6070-6078 (2009)
Non-Patent Document 3: Molecular Cancer Therapeutics, Vol. 1, pp. 197-204 (2002)
Non-Patent Document 4: South African Medical Journal, Vol. 57, pp. 551-552 (1980)
Non-Patent Document 5: Clinical Psychopharmacology and Neuroscience Vol. 15, pp. 68-69 (2017)
Non-Patent Document 6: Indian Journal of Psychiatry, Vol. 48, pp. 62-63 (2006)
Non-Patent Document 7: The package insert for "NOCBIN Powder", 10th edition, revised in April 2015 (authorization number: 22000AMX02130)
Non-Patent Document 8: Chronobiologia. 1975 October-December; 2(4): 307-16
Non-Patent Document 9: J Psychiatr Res. 1972 December; 9(4): 293-314
Non-Patent Document 10: Acta Psychiatr Scand. 1967; 43(4): 376-84
Non-Patent Document 11: ClinicalTrials.gov Identifier: NCT03469128, "Cognitive Processing Therapy Versus Medication for the Treatment of Post Traumatic Stress Disorder & Substance Use Disorder Egyptian Patients." [https://clinicaltrials.gov/ct2/show/record/NCT03469128]
Non-Patent Document 12: ClinicalTrials.gov Identifier: NCT03212599, "Disulfiram as a Modulator of Amyloid Precursor Protein-processing (DIMAP)." [https://clinicaltrials.gov/ct2/show/NCT03212599]

SUMMARY OF THE INVENTION

Problems to be Solved by the Invention

An object of the present invention is to provide a novel measure that is effective in therapeutic or other treatment of psychiatric or neurological disorders or symptoms, such as anxiety or depressive disorders, and is unlikely to cause problems such as dependence and adverse effects and is highly safe.

Means for Solving the Problems

The inventors studied hard and surprisingly found that disulfiram and its related compounds have anxiolytic-like effects and antidepressant effects comparable to those of diazepam, an existing benzodiazepine anxiolytic drug, and can be used as anxiolytic and antidepressant drugs that cause less dependence and produce less adverse effects than conventional drugs, and further found that disulfiram also improves cognitive functions and is efficacious for psychiatric or neurological symptoms such as dementia and associated behavioral and psychological symptoms, and finally completed the invention.

That is, the present invention provides an agent for treating, preventing, or ameliorating a psychiatric or neurological disorder or symptom, comprising any of the following (1) to (5) as an active ingredient:
(1) disulfiram;
(2) a metal complex of diethyldithiocarbamate;
(3) a disulfide capable of generating diethyldithiocarbamate in the body;
(4) a pharmaceutically acceptable salt of (1), (2), or (3); and
(5) a solvate of (1), (2), (3), or (4).

Effect of the Invention

By the present invention, an agent containing disulfiram or its related compound (a metal complex of diethyldithiocarbamate or a disulfide capable of generating diethyldithiocarbamate in the body) as an active ingredient has been provided as an agent for treating, preventing, or ameliorating psychiatric or neurological disorders or symptoms. Disulfiram is an agent that has been used as an anti-alcoholism drug in Japan since 1983, and its long-term safety has been established. The agent of the present invention is less likely to cause problems such as dependence and adverse effects and is safer than conventional anxiolytic and antidepressant drugs.

MODE FOR CARRYING OUT THE INVENTION

Figure 1:
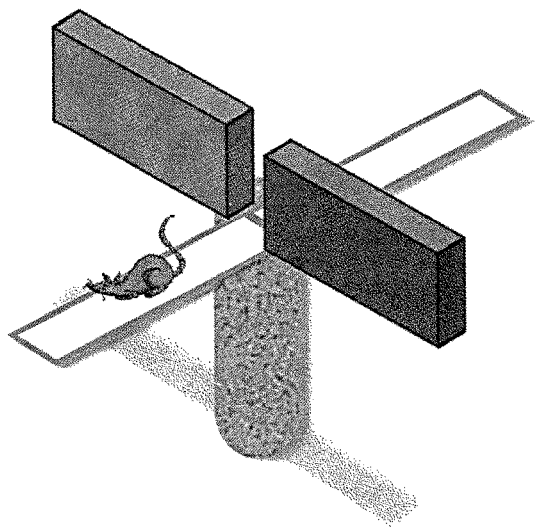
FIG. 1 shows a schematic diagram of an elevated plus maze (EPM) apparatus used in EXAMPLES.

The agent of the present invention is an agent for treating, preventing, or ameliorating psychiatric or neurological disorders or symptoms, which contains any of the following (1) to (5) as an active ingredient:
(1) disulfiram;
(2) a metal complex of diethyldithiocarbamate;
(3) a disulfide capable of generating diethyldithiocarbamate in the body;
(4) a pharmaceutically acceptable salt of (1), (2), or (3); and
(5) a solvate of (1), (2), (3), or (4).

In one aspect, the agent of the present invention comprises disulfiram, a pharmaceutically acceptable salt of disulfiram, or a solvate of disulfiram or the pharmaceutically acceptable salt thereof, as an active ingredient. In another aspect, the agent of the present invention contains a metal complex of diethyldithiocarbamate, a pharmaceutically acceptable salt of the complex, or a solvate of the complex or the pharmaceutically acceptable salt thereof, as an active ingredient.

Disulfiram (chemical name: tetraethylthiuram disulfide) as described as the above (1) itself is a known compound and is conventionally used as an anti-alcoholism drug for treatment of chronic alcoholism. Disulfiram is a prescription drug listed in the Japanese Pharmacopoeia, and its production method is well known.

The metal complex of diethyldithiocarbamate (DDC) as described as the above (2) may be a complex of any metal. The metal may be a monovalent, divalent, or higher valent metal. In one aspect, the metal complex of diethyldithiocarbamate is a complex of a divalent or higher valent metal. Specific examples of the metal complex include, but are not limited to, monovalent metal complexes, such as sodium complex and lithium complex, and complexes of divalent or higher valent metals, such as copper complex, iron(II) complex, iron(III) complex, zinc complex, platinum complex, gold complex, aluminium complex, magnesium complex, vanadium complex, selenium complex, cobalt(II) complex, and cobalt(III) complex. A metal complex of DDC can be prepared by complex formation between a diethyldithiocarbamate compound, such as sodium diethyldithiocarbamate, and a metal ion, and various metal-DDC complex products are commercially available.

Typically, the disulfide as described as the above (3) is a compound from which at least one DDC molecule, for example one DDC molecule, is produced in the body through cleavage of S—S bond in one molecule of the disulfide compound. Such a disulfide compound may be a compound which has a structure represented by Formula 1 below in its molecule. The wavy line in Formula 1 indicates that the remaining moiety beyond this line is omitted. The remaining moiety beyond the wavy line may have any structure, provided that the structure does not disturb the cleavage of S—S bond. A disulfide with such a structure can be produced by any method known in the art of chemical synthesis.

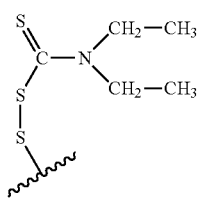

Formula 1

Specific examples of the disulfide as described as the above (3) include, but are not limited to, DDC-added disulfide compounds (for example, a compound represented by Formula 1 in which the structure beyond the wavy line is that of glutathione) formed via SS exchange reaction between disulfide compounds, such as oxidized glutathione (GSSG: Glutathione-S—S-Glutathione), and DSF, and DDC-added proteins (for example, a compound represented by Formula 1 in which the structure beyond the wavy line is that of thioredoxin) formed via SS exchange reaction between proteins with at least one pair of functional cysteine residues, such as thioredoxin, and DSF.

Each of the compounds (1) to (3) may be used in the form of a pharmaceutically acceptable salt thereof. The salt may be an acid addition salt or a base addition salt. Specific examples of the acid addition salt include inorganic acid salts, such as hydrochloric acid salt, hydrobromic acid salt, sulfuric acid salt, hydroiodic acid salt, nitric acid salt, and phosphoric acid salt, and organic acid salts, such as citric acid salt, oxalic acid salt, acetic acid salt, formic acid salt, propionic acid salt, benzoic acid salt, trifluoroacetic acid salt, maleic acid salt, tartaric acid salt, methanesulfonic acid salt, benzenesulfonic acid salt, and para-toluenesulfonic acid salt. Specific examples of the base addition salt include inorganic base salts, such as sodium salt, potassium salt, calcium salt, magnesium salt, and ammonium salt, and organic base salts, such as triethylammonium salt, triethanolammonium salt, pyridinium salt, and diisopropylammonium salt. Any of the salts can be produced by any method known in the art of chemical synthesis.

Additionally, each of the compounds (1) to (3) and pharmaceutically acceptable salts thereof may also be used in the form of a solvate. Specific examples of the solvate include hydrates and ethanolates, but the solvate is not limited thereto and may be any solvate, provided that the solvate is a solvate with a pharmaceutically acceptable solvent. The solvates of the compounds (1) to (3) and of the salts thereof can be produced by any method known in the art of chemical synthesis.

In one aspect, the psychiatric or neurological disorder or symptom is an anxiety disorder (anxiety) or anxiety symptom. The term "anxiety disorder" or "anxiety symptom" encompasses various anxiety disorders (anxieties), anxiety conditions, and associated symptoms including, but not limited to, for example, various anxiety disorders such as agoraphobia, social phobia, social anxiety disorder, anthropophobia, nosophobia, obsessive-compulsive disorder, generalized anxiety disorder, irritable bowel syndrome, mixed anxiety-depressive disorder, post-traumatic stress disorder (PTSD), acute stress disorder, panic attack, panic disorder, panic disorder with agoraphobia, adjustment disorder, and separation anxiety disorder; various symptoms of these anxiety disorders, such as anxiety, fear, tension, heart palpitations, respiratory distress, shortness of breath, fatigue, nausea, headache (for example, tension-type headache), tachycardia, muscle weakness, muscle tone, chest pain, stomach pain, blanching, blushing, sweating, tremors, pupil dilation, and dizziness; and various anxiety conditions associated with various psychiatric or neurological diseases or the like, such as anxiety associated with dementia. PTSD may be PTSD without co-occurring substance use disorder (SUD). For example, the anxiety disorders or anxiety symptoms in the present invention may be anxiety disorders or symptoms, including PTSD, without co-occurring SUD. Or, the anxiety disorders or anxiety symptoms in the present invention may be anxiety disorders or symptoms except PTSD, or may be anxiety disorders or anxiety symptoms except PTSD, acute stress disorder and adjustment disorder.

In another aspect of the present invention, the term "anxiety disorder or anxiety symptom" refers to an anxiety disorder or symptom classified into anxiety disorders according to the classification of illness in "Diagnostic and Statistical Manual of Mental Disorders, Fifth Edition" (DSM-5) by American Psychiatric Association. Specific examples of such an anxiety disorder or symptom include separation anxiety disorder, selective mutism, specific phobia, social anxiety disorder (social phobia), panic disorder, panic attack specifier, agoraphobia, generalized anxiety disorder, and substance/medication-induced anxiety disorder.

In one aspect, the psychiatric or neurological disorder or symptom as a subject of the present invention is an obsessive-compulsive disorder or a related disorder classified into obsessive-compulsive and related disorders according to the classification of illness in DSM-5. Specific examples of such an obsessive-compulsive disorder or a related disorder include obsessive-compulsive disorder, body dysmorphic disorder, hoarding disorder, trichotillomania, excoriation disorder, and substance/medication-induced obsessive-compulsive and related disorder.

According to the classification in DSM-5, PTSD, acute stress disorder, and adjustment disorder are classified into "trauma- and stressor-related disorders," as well as reactive attachment disorder, disinhibited social engagement disorder, and the like are classified into the same category. In one aspect of the present invention, any disorders falling within the trauma- and stressor-related disorders according to the classification in DSM-5 are not included in the term anxiety disorder or symptom. In another aspect, the psychiatric or neurological disorder or symptom as a subject of the present invention is a trauma- and stressor-related disorder according to the classification in DSM-5.

In one aspect, the psychiatric or neurological disorder or symptom is depressive disorder or depressive symptom. The term "depressive disorder or depressive symptom" encompasses various depressions, depressive symptoms and depressive disorders including, but not limited to, for example, various depressive disorders such as major depressive disorder (MDD), atypical depression, melancholic depression, psychotic major depression or psychotic depression, catatonic depression, postnatal depression, seasonal affective disorder (SAD), chronic depression (dysthymia), double depression, other unspecified depressive disorders, depressive personality disorder (DPD), recurrent brief depression (RBD), minor depressive disorder (minor depression), obsessive-compulsive disorder, premenstrual syndrome, premenstrual dysphoric disorder, and depression caused by chronic physical conditions (for example, cancer, chronic pain, chemotherapy, or chronic stress); and various depressive symptoms, including symptoms associated with the above-described depressive disorders, for example, mood disorders such as feelings of depression, sadness, loneliness and the like, reduced motivation, retarded thinking, pessimistic thinking, sleep disorders, reduced appetite, depressive symptoms observed in bipolar disorders, depressive symptoms observed in PTSD, and depressive symptoms observed in substance-related and addictive disorders.

In one aspect, the psychiatric or neurological disorder or symptom is dementia or behavioral and psychological symptoms of dementia (BPSD). The dementia encompasses Alzheimer's dementia and other types of dementia associated with various psychiatric or neurological disorders. The BPSD includes memory impairment, disorientation, aphasia, apraxia and agnosia, depression, anxiety, hallucination, delusions, sleep disorders, behavioral disorders, irritability, screaming, rejection, wandering, filthy behavior, pica, and the like. Or, the dementia in the present invention may be any type of dementia other than Alzheimer's disease.

The route of administration of the agent according to the present invention is not specifically limited. The route may be systemic or topical, or may be oral or parenteral. Examples of the parenteral administration include, but are not limited to, intramuscular administration, subcutaneous administration, intravenous administration, intraarterial administration, transdermal administration, nasal administration, and intraperitoneal administration.

The dosage form of the agent according to the present invention is also not specifically limited, and the formulation can be obtained by appropriately mixing disulfiram or the like as an active ingredient with pharmaceutically acceptable additives suitable for each route of administration, such as carrier, diluent, excipient, binder, lubricant, disintegrating agent, sweetening agent, suspending agent, emulsifier, coloring agent, taste masking agent, and stabilizing agent. Examples of the formulation include oral preparations such as tablets, hard capsules, soft capsules, granules, powders, and syrups, and parenteral preparations such as inhalant, injections, suppositories, liquids, sprays, gels, and patches. Formulation methods and available additives are well known in the field of pharmaceutical preparation, and any of the methods and additives can be used. In addition, the agent of the present invention (particularly a metal complex of diethyldithiocarbamate, its pharmaceutically acceptable salt, or a solvate of them) may be provided in the form of a health food or a nutritional supplement.

Techniques for preparing sustained release formulations are also well known. The agent of the present invention may be provided as a sustained release formulation to provide and maintain a stable blood concentration of the active ingredient. The term "sustained release" as used herein has the same meaning as controlled release and also includes delayed release and the like. In the techniques for preparing sustained release formulations, formulations are classified into single-unit type or multiple-unit type based on the form of a sustained release formulation or into reservoir type or matrix type based on the release control mechanism of a sustained release formulation, and a hybrid-type formulations in which multiple release mechanisms are integrated are also known. When the agent of the present invention is prepared as a sustained release formulation, any of the techniques for preparing sustained release formulations may be used. A DDS such as liposomes may also be used for the preparation. The sustained release formulation may be prepared in any dosage form, such as tablet, granule, or capsule. Specific examples of the sustained release formulation of disulfiram include the disulfiram formulation described in WO 2012/076897 A1 in which liposome is used as a DDS, and the solid dispersion tablets of disulfiram described in International Journal of Pharmaceutics 497 (2016) 3-11 in which a polyvinyl acetate/polyvinyl pyrrolidone mixture or hypromellose is used as a sustained release polymer. Sustained release formulations containing any of the compounds as described as the above (2) to (5) can also be prepared by following the above techniques. However, a sustained release formulation that can be used for the agent of the present invention is not limited to those specific examples.

The amount of the agent of the present invention to be administered is appropriately selected depending on the conditions and body weight of a patient, route of administration, and the like. Although not particularly limited, for example, about 0.001 mg to about 20 g, e.g. about 0.1 mg to about 5 g, or about 1 g to about 10 g of the active ingredient may be given to an adult human (with a body weight of about 60 kg) in a single dose or several divided doses per day. The agent of the present invention may be used in combination with existing anxiolytics, antidepressants and the like.

The agent of the present invention can be administered to a subject with a psychiatric or neurological disorder or symptom for the purpose of treating or ameliorating such a disorder or symptom. Additionally, the agent of the present invention can also be prophylactically administered to a subject for the purpose of preventing onset of psychiatric or neurological symptoms.

A subject to which the agent of the present invention is administered is typically a mammal, and the agent of the present invention can be used for various mammals, including human, mouse, rat, hamster, rabbit, cat, dog, cow, horse, sheep, monkey, and the like. In one aspect, the subject to which the agent of the present invention is administered is human.

EXAMPLES

The present invention is more specifically described below by way of Examples. However, the present invention is not limited to the Examples below.
I. Anxiolytic-Like Effect of Disulfiram
1. Experimental Methods
(1) Animals Used
  Male ICR mice, 6 to 8 weeks old
(2) Test Drugs
  Disulfiram: "NOCBIN," manufactured by Mitsubishi Tanabe Pharma Corporation was used.
  Cyanamide: "CYANAMIDE," manufactured by Mitsubishi Tanabe Pharma Corporation was used.
  Diazepam: "Diazepam," manufactured by FUJIFILM Wako Pure Chemical Corporation was used.

Metal-DDC complexes (Fe(DDC)$_3$, Cu(DDC)$_2$): diethyldithiocarbamic acid ferric salt and copper diethyldithiocarbamate manufactured by Tokyo Chemical Industry Co., Ltd. were used.

(3) Preparation Method of Drugs to be Administered

NOCBIN, cyanamide, and the metal-DDC complexes were dissolved in DMSO and then frozen and stored at −30° C. On the day of test, each solution was diluted with Tween 80 and corn oil to have concentrations of Tween 80, DMSO, and corn oil at 2%, 10%, and 88%, respectively.

(4) Test Method

An elevated plus maze (EPM) apparatus (FIG. 1) was used to assess anxiety-like behaviors in mice administered with any of the test drugs. The EPM apparatus is a plus-shaped maze apparatus with open and closed arms and is used for assessment of anxiety-like behaviors of animals. Animals administered with a benzodiazepine (BZD) anxiolytic drug are known to increase the ratio of time spent in the open arm and the ratio of open arm entries. The EPM test is the most representative test available as a system for evaluating an anxiolytic drug.

Mice were acclimated to the testing laboratory for 60 minutes, and a prepared test drug was then administered to each mouse at a dose of 0.25 mL/20 g. After the elapse of a predetermined period of time from the administration of the drug, the EPM apparatus was used to quantify exploration behavior of the mouse for 5 minutes. The equations below were used to evaluate the effects of each test drug on exploration behavior in mice. Statistical analysis was performed with Dunnett's multiple comparison test, and a significant difference was considered at P<0.05.

Time spent in open arm (%)=Time spent in open arm (sec)/{Time spent in open arm (sec)+Time spent in closed arm (sec)}×100

Open arm entry (%)=Open arm entries (times)/ {Open arm entries (times)+Closed arm entries (times)}×100

Total arm entries (times)=Open arm entries (times)+ Closed arm entries (times)

2. Results (1) Dose-Dependency of Anxiolytic-Like Effect of Disulfiram

Disulfiram was administered intraperitoneally to mice (n=8 per group) at a dose of 20, 40, or 80 mg/kg, and the mice were tested 30 minutes after the administration for their exploration behavior by using the EPM apparatus. As a positive control experiment, diazepam, a BZD anxiolytic drug, was administered subcutaneously to mice at a dose of 1.5 mg/kg (equivalent to the dose used clinically for humans), and the mice were similarly tested for their exploration behavior by using the EPM apparatus. A solution of 2% Tween 80, 10% DMSO, and 88% corn oil was administered intraperitoneally to mice in the solvent control group.

Figure 2:
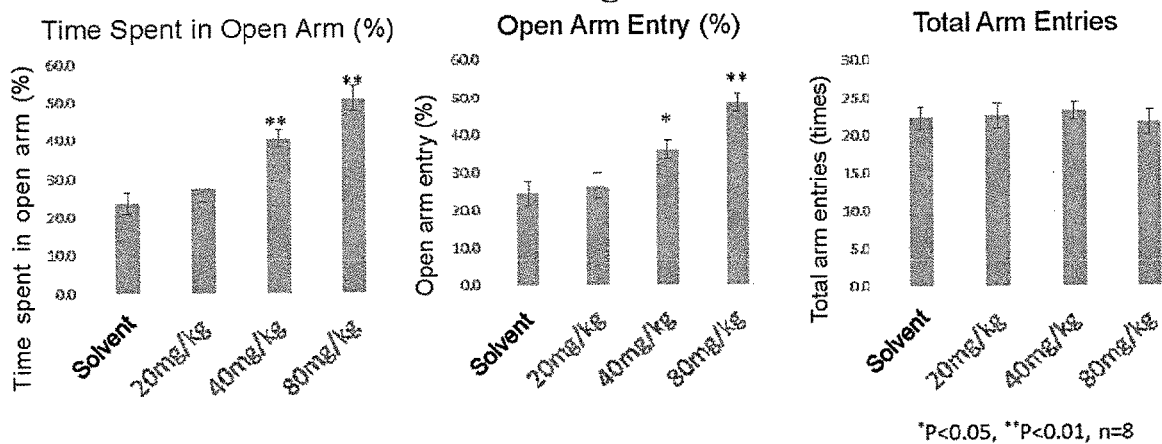
FIG. 2 shows results from an experiment using the EPM apparatus to investigate the dose-dependent anxiolytic-like effect of disulfiram.
Figure 3:
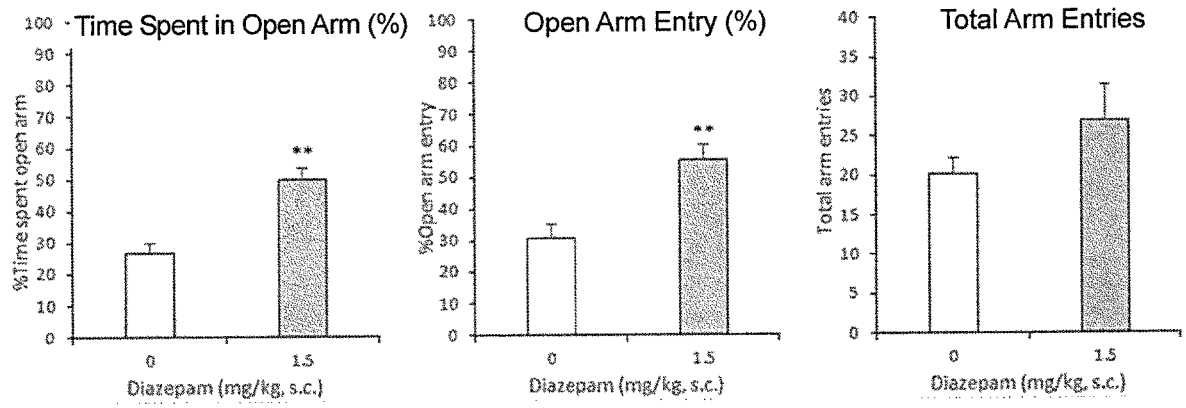
FIG. 3 shows results from an experiment using the EPM apparatus to evaluate the anxiolytic-like effect of diazepam.

The results from disulfiram and from diazepam are shown in FIGS. 2 and 3, respectively. It was demonstrated that disulfiram significantly increased the ratios of time spent in the open arm and of open arm entries in a dose-dependent manner (* indicates P<0.05, ** indicates P<0.01, vs. the solvent control group). The increased ratios of time spent in the open arm and of open arm entries induced by disulfiram at a dose of 40 mg/kg to 80 mg/kg were similar to those induced by diazepam (FIG. 3). Moreover, disulfiram showed no significant effect on total arm entries, suggesting that disulfiram had no effect on motor function. Accordingly, disulfiram was confirmed to have an anxiolytic-like effect comparable to that of diazepam.

(2) Time-Dependency of Anxiolytic-Like Effect of Disulfiram

Disulfiram was administered to mice (n=8 per group) at a dose of 40 mg/kg, and the mice were tested 15, 30, 60, or 120 minutes after the administration for their exploration behavior by using the EPM apparatus.

Figure 4:
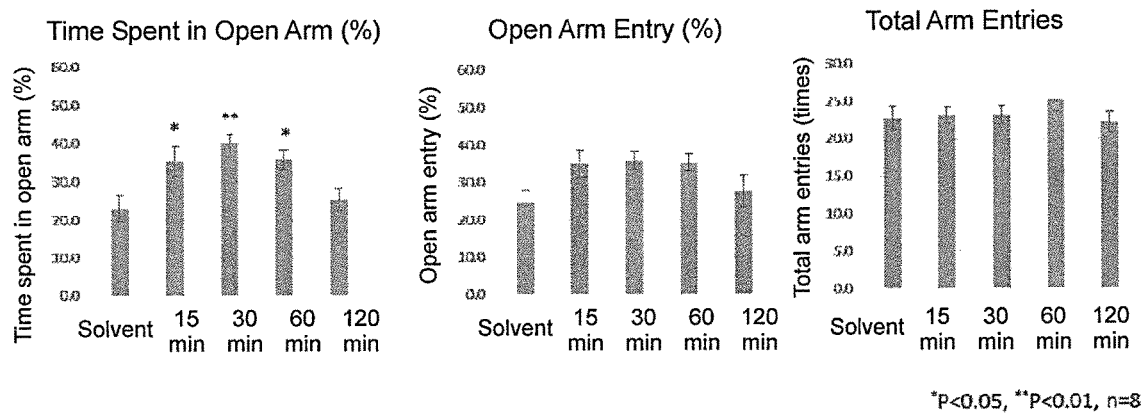
FIG. 4 shows results from an experiment using the EPM apparatus to investigate the time-dependent anxiolytic-like effect of disulfiram.

The results are shown in FIG. 4. It was demonstrated that disulfiram significantly increased the ratio of time spent in the open arm from 15 minutes after the administration (* indicates P<0.05, ** indicates P<0.01, vs. the solvent control group), and the effect of disulfiram was observed till 60 minutes after the administration. The peak anxiolytic-like effect of disulfiram was observed at 30 minutes.

(3) Investigation of Anxiolytic-Like Effect of Cyanamide

Both disulfiram and cyanamide (H$_2$ N—CN) are drugs with inhibitory activity against alcohol dehydrogenase and have been conventionally used as anti-alcoholism drugs that cause sickness when alcohol is ingested, which promotes abstinence from alcohol. Cyanamide was investigated for the presence of an anxiolytic-like effect. Cyanamide or disulfiram was administered to mice (n=6 per group) at a dose of 80 or 40 mg/kg, respectively, and the mice were tested 30 minutes after the administration for their exploration behavior by using the EPM apparatus.

Figure 5:
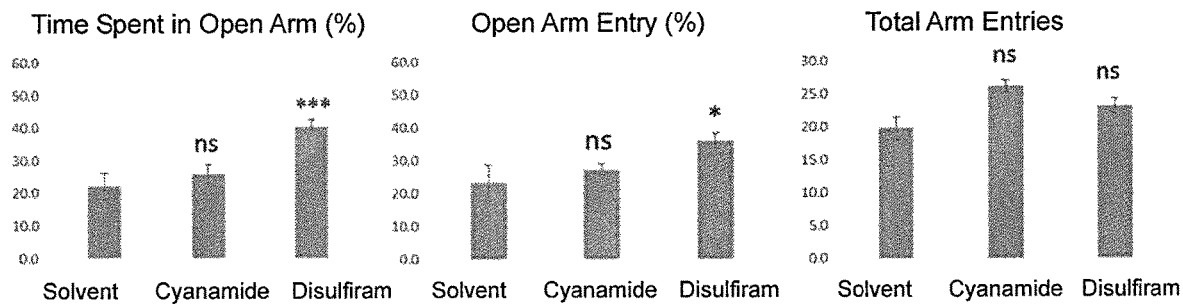
FIG. 5 shows results from an experiment using the EPM apparatus to evaluate the anxiolytic-like effect of cyanamide.

The results are shown in FIG. 5. Cyanamide demonstrated no significant effects on the ratios of time spent in the open arm and of open arm entries and was confirmed to have no anxiolytic-like effect.

(4) Anxiolytic-Like Effect of DSF-Related Compound—Fe(DDC)$_3$

The iron(III) complex of diethyldithiocarbamate (DDC) (Fe(DDC)$_3$) as a disulfiram (DSF)-related compound was investigated for the presence of an anxiolytic-like effect. Each drug was administered intraperitoneally to mice in the Fe(DDC)$_3$ dose group (n=5) and the DDC dose group (n=4) at a dose of 40 mg/kg. A solution of 2% Tween 80, 10% DMSO, and 88% corn oil was administered intraperitoneally to mice in the solvent control group (n=9). Thirty minutes after the administration, the elevated plus maze test was performed for 5 minutes.

Figure 6:
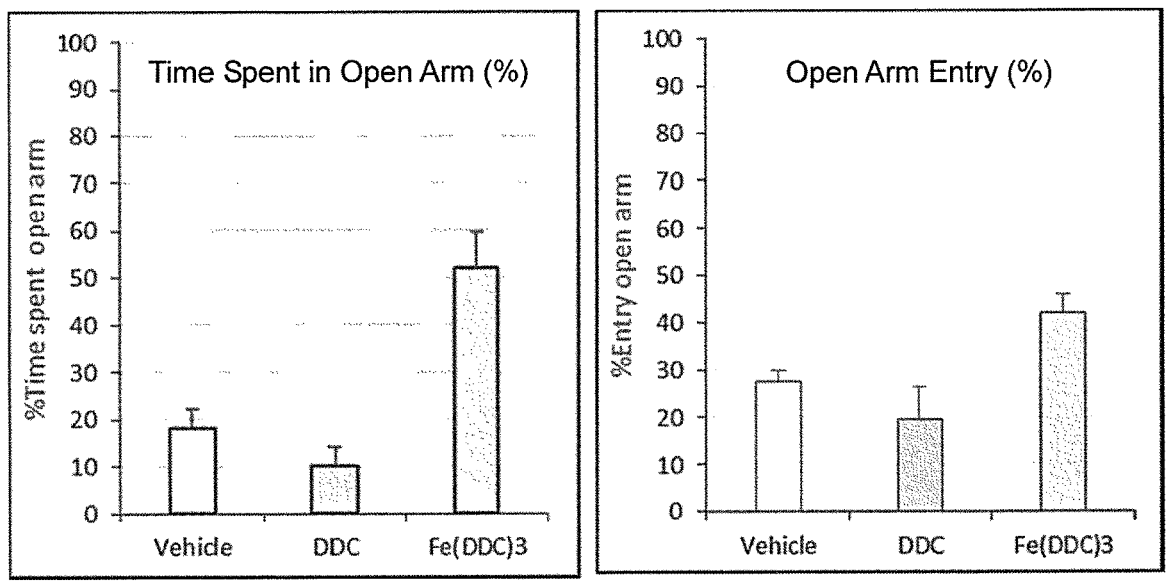
FIG. 6 shows results from an experiment using the EPM apparatus to evaluate the anxiolytic-like effect of the iron (III) complex of diethyldithiocarbamate (DDC).

The results are shown in FIG. 6. A strong sedative effect was observed in three mice of the Fe(DDC)$_3$ dose group, and the mice did not show exploration in the apparatus, so that the anxiolytic-like effect in these mice could not be evaluated. In two mice with no sedative effect, significantly increased ratios of time spent in the open arm and of open arm entries were observed (the data from the Fe(DDC)$_3$ dose group shown in FIG. 6 are the average values from these two mice). Accordingly, Fe(DDC)$_3$, a metal complex of DDC, was confirmed to have an anxiolytic-like effect.

(5) Anxiolytic-Like Effect of DSF-Related Compound—Cu(DDC)$_2$

The copper complex of DDC (Cu(DDC)$_2$) as a DSF-related compound was investigated for the presence of an anxiolytic-like effect. Cu(DDC)$_2$ was administered orally to mice (n=4) at a dose of 40 mg/kg. A solution of 2% Tween 80, 10% DMSO, and 88% corn oil was administered orally to mice in the solvent control group (n=4). Sixty minutes after the administration, the elevated plus maze test was performed for 5 minutes.

Figure 7:
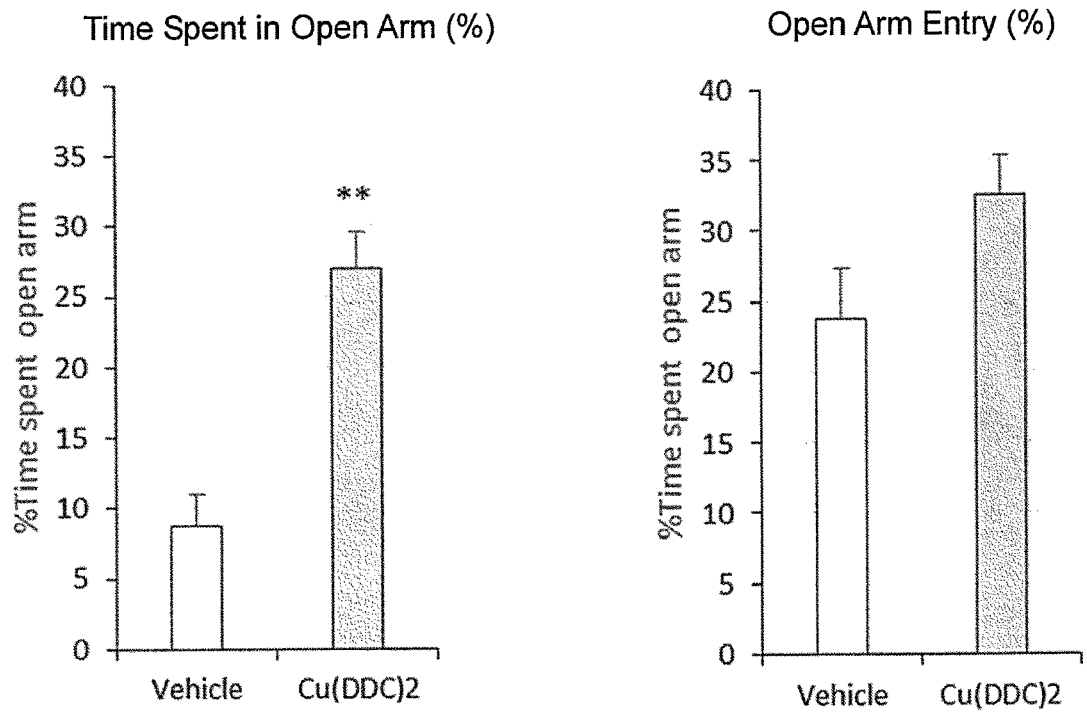
FIG. 7 shows results from an experiment using the EPM apparatus to evaluate the anxiolytic-like effect of the copper complex of DDC.

The results are shown in FIG. 7. A significantly increased ratio of time spent in the open arm was observed in the Cu(DDC)$_2$ dose group. The ratio of open arm entries showed a clear tendency to increase by the administration Cu(DDC)$_2$, though it was not significantly different. Accordingly, Cu(DDC)$_2$, a metal complex of DDC, was confirmed to have an anxiolytic-like effect.

II. Cognitive Function Improving Effect of Disulfiram (1) Animals Used

Male C57BL/6J mice (2) Test Drugs

Disulfiram (DSF), manufactured by Mitsubishi Tanabe Pharma Corporation

Sucrose, FUJIFILM Wako Pure Chemical Corporation (3) Preparation Method of Drugs to Be Administered To 1 g of an MF diet, 0.8 mg of DSF and 50 mg of sucrose or only 50 mg of sucrose (without DSF) were added to prepare a DSF diet or a control diet, respectively, as a solid diet.

(4) Test Method and Results (Object Recognition)

Figure 8:
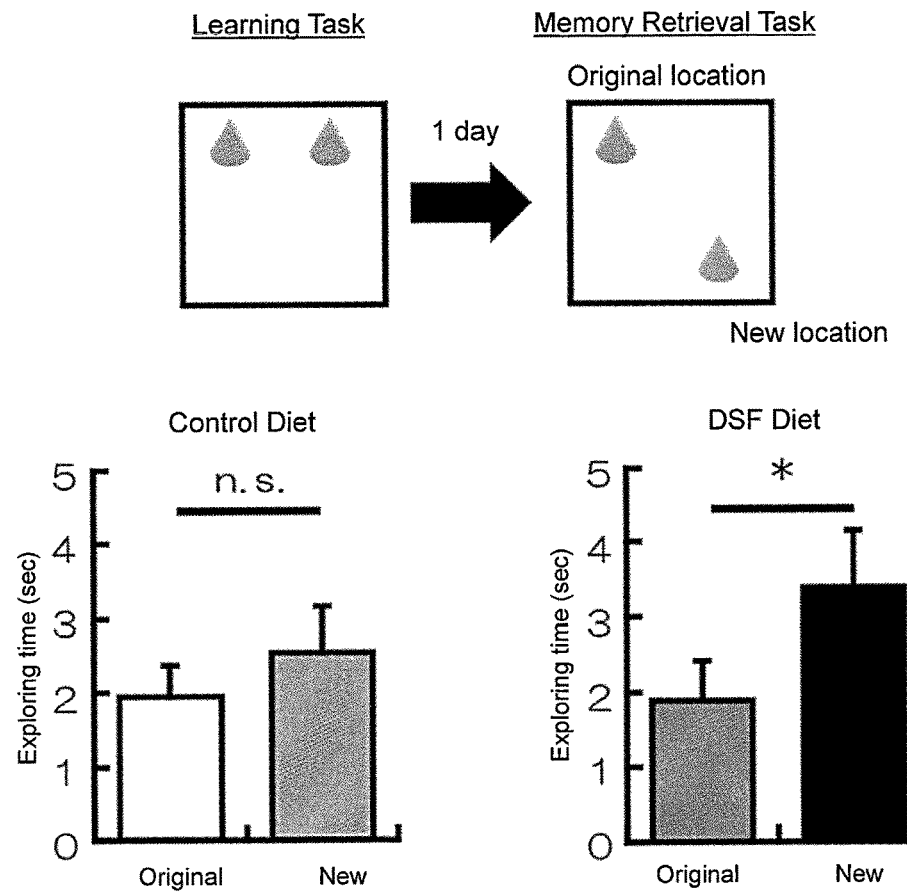
FIG. 8 shows a diagram describing the overview of the novel object location task (NOL) conducted in EXAMPLES (upper panel) and results from the NOL memory retrieval task (lower panel).

The novel object location task (NOL) was conducted to assess object recognition function in mice administered with any of the test drugs. The NOL is a test used to evaluate the ability to remember the location of an object (Dix, S. L. & Aggleton, J. P., Behav Brain Res: 1999 March; 99(2): 191-200). Mice were placed in a 33 cm square white box (open field: OF) and allowed to explore the white box freely for 10 minutes every day in the period of 3 days (acclimation). On Day 4, two objects with the same shape were placed in the OF apparatus, and the mice were allowed to learn the locations of the objects (FIG. 8; learning). On Day 5, one of the objects was relocated to a location that was different from the original location during the learning tasks, and the mice were allowed to explore the objects for 5 minutes, and the length of time spent exploring the objects was measured (FIG. 8; memory retrieval task). Since mice have a tendency to explore novel objects, mice which remembered the locations of the objects during the task on the previous day would spend longer time for exploring the relocated object than exploring the other object during the memory retrieval task.

The mice were fed with the DSF diet or the control diet for 3 weeks (N=12 per group). In the NOL memory retrieval task, the length of time spent exploring each object was measured to evaluate the effect of each test drug on the cognitive ability of the mice. Statistical analysis was performed with Student's t-test, and a significant difference was considered at P<0.05.

The results indicated that no significant difference was observed in the time spent for exploration between the object remaining at the original location and the other relocated object during the memory retrieval task in the group of mice fed with the control diet for 3 weeks, and that a significantly longer time was spent for exploring the other relocated object than exploring the object remaining at the original location by the mice in the DSF diet-fed group (FIG. 8; *p<0.05 indicates a significant difference vs. the object remaining at the original location).

(5) Test Method and Results (the Spatial Learning Ability)

Figure 9:
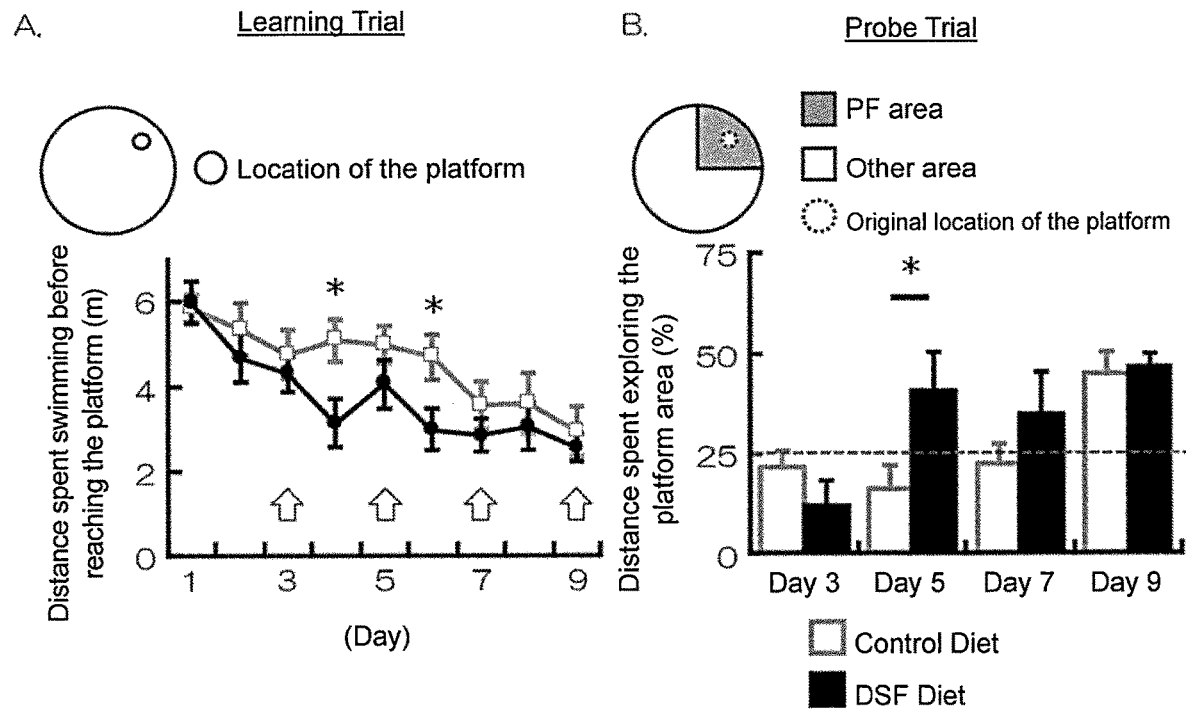
FIG. 9 shows results from the Morris water maze task. The spatial learning ability was assessed based on the distance traveled to find a platform (A). In addition, the effect of a test drug on spatial memory formation was evaluate from the ratio of time spent exploring the area at each probe trial after the platform was removed from the original location (B).

Next, the Morris water maze task (WM) was conducted to assess spatial learning ability in mice administered with any of the test drugs. The WM is widely used for assessing spatial learning and memory in mice (Morris, R. G. M., Learning and Motivation: 1981, 12, 239-260). A WM apparatus was a circular pool of 120 cm in diameter, filled with white-colored water and equipped with a submerged platform (PF) on which a mouse was allowed to stand and rest. Mice were allowed to swim from a randomly selected starting point in the pool, and the distance spent swimming before reaching the hidden platform was measured (FIG. 9A). The task was repeated 4 times a day on the days of non-probe trials and 3 times a day on the days of probe trials.

Mice learn the location of the platform using spatial cues outside the pool as a reference. The distance traveled to find the platform becomes shorter as the trial is repeated more times (FIG. 9A). Thus, the spatial learning ability can be assessed based on the distance traveled to find the platform. At the first trial on each of days 3, 5, 7, and 9 during the learning (FIG. 9A; indicated by open arrows), the platform was removed from the pool, and the mice were allowed to swim for 1 minute to measure the length of time spent exploring the quadrant where the platform had been located (probe trial). The effect of a test drug on spatial memory formation was evaluated from the ratio of time spent exploring the area at each probe trial after the platform was removed from the original location. Mice which strongly remembered the location of the platform would spend longer time for exploring the area where the platform had been located.

The mice were fed with the DSF diet (N=7) or the control diet (N=9) for 4 weeks. At the WM learning trials, the distance spent swimming before reaching the platform was measured every day to evaluate the effect of each test drug on the spatial learning of the mice. Moreover, the effect of each test drug on the spatial memory formation in the mice was evaluated at the probe trials. Statistical analysis was performed with Student's t-test, and a significant difference was considered at P<0.05.

The results indicated that the distance traveled to find the platform on Days 4 and 6 was shorter in the group of mice fed with the DSF diet for 4 weeks than in the group of mice fed with the control diet (FIG. 9A; * indicates a significant difference at p<0.05 vs. the control diet), and that the time spent for exploring the platform area at the probe trial on Day 5 was significantly longer in the DSF group than in the control group (FIG. 9B; * indicates a significant difference at p<0.05 vs. the control diet).

Accordingly, disulfiram was confirmed to have a cognitive function improving effect.

III. Antidepressant-Like Effect of Disulfiram (1) Animals

Male ICR mice/Male C57BL/6J mice (2) Test Drugs

Disulfiram (DSF), manufactured by Mitsubishi Tanabe Pharma Corporation

Sucrose, manufactured by FUJIFILM Wako Pure Chemical Corporation (3) Preparation Method of Drugs to be Administered To 1 g of an MF diet, 0.8 mg of DSF and 50 mg of sucrose or only 50 mg of sucrose (without DSF) were added to prepare a DSF diet or a control diet, respectively, as a solid diet.

(4) Test Method and Results (Antidepressant Effect Based on Reduction of Hyperemotional Responses)

ICR mice were allowed to eat the DSF diet (200 mg/day) freely for 3 months to assess hyperemotional response and hyperactivity. Hyperemotional response was evaluated in those mice according to the method of Kelly et al., (Kelly, J. P. et al., Pharmacol. Ther. Vol. 74, No. 3, pp. 299-316, 1997) by individually scoring (A) the response to an object placed in front of the nose, (B) the response to air blown thereon, or (C) the resistance to handling, based on the following criteria of emotional responses:

0: no response;

1: interest in the object, or only a slight movement, or easy to handle;

2: protective or evasive actions against the object, or expression of surprise, or nervous but still easy to handle;

3: aggressive actions such as biting, or clear expression of surprise, or nervous and difficult to handle;

4: highly aggressive actions, or expression of surprise with jumping, or quite difficult to handle.

The hyperactivity of each mouse was measured over a period of 30 seconds by counting the number of times the mouse crossed the lines that divided the floor of a cage to four areas. Statistical analysis was performed with Student's t-test, and a significant difference was considered at P<0.05.

Figure 10:
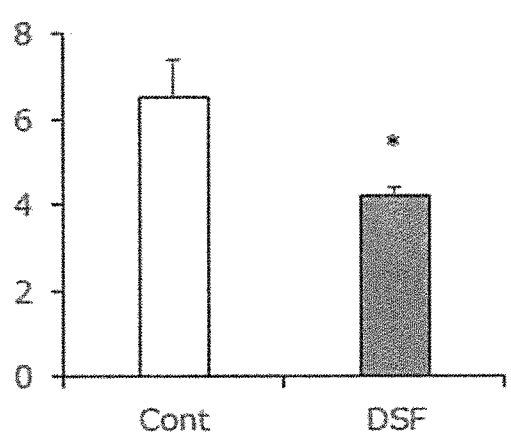
FIG. 10 shows results from evaluation of hyperemotional response and hyperactivity in mice following chronic administration of disulfiram.
Figure 10:
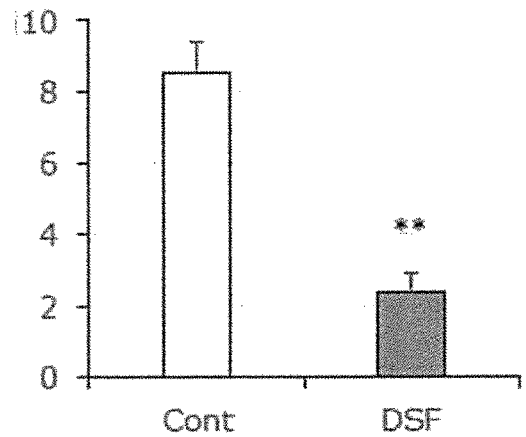
Figure 11:
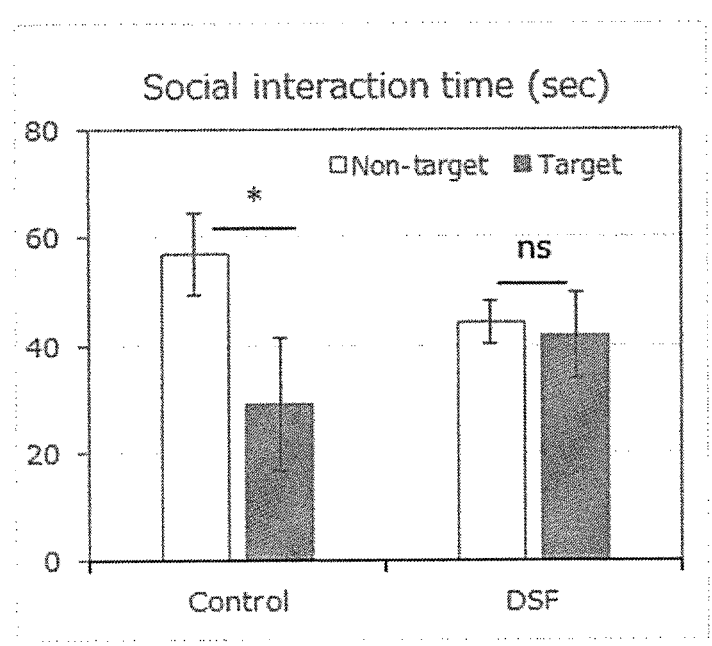
FIG. 11 shows results from evaluation of social interaction after exposure to stress in mice following chronic administration of disulfiram.

The results indicated that significant decreases in hyperemotional response (FIG. 10A) and in hyperactivity (FIG. 10B) were observed in the DSF diet group compared with the control diet group (* indicates p<0.05, and ** indicates p<0.01).

The decrease in occurrence of hyperemotional response and hyperactivity resulting from chronic administration of a test drug is considered to be indicative of the antidepressant effect of the test drug (Kelly, J. P. et al., 1997, supra; Saitoh, A. et al., Psychopharmacology (2007) 191: 857-865). Accordingly, DSF was suggested to have an antidepressant effect.

(5) Test Method and Results (Antidepressant-Like Effect Based on Social Interaction)

C57BL/6J mice were allowed to eat the DSF diet (200 mg/day) freely for 3 months and then exposed to social defeat stress (SDS) for 10 days to create mouse models of depression (SDS models) (Golden S. A. et al., Nat Protoc. Vol. 6, No. 8, pp. 1183-1191, 2011). The SDS models were created by placing a single C57BL/6J mouse in a home cage where a male ICR mouse had been housed for a long period of time and exposing the mouse to physical aggression by the ICR mouse. In this study, the stress exposure was applied for 10 minutes a day in a period of consecutive 10 days. Depressive-like symptoms were evaluated by the social interaction (SI) test (Golden S. A. et al., 2011, supra). An apparatus composed of an open field apparatus (45 cm×45 cm×30 cm) and a mesh cage (8 cm×6 cm×30 cm) placed on one side of the open field apparatus was used to perform the SI test, in which the time (SI time) spent by the C57BL/6J mouse approaching and making contact with the ICR mouse (Target) in the mesh cage during the measurement time (2.5 minutes) was compared with that in the absence of the ICR mouse (Non-target).

The results indicated that the SI time in the control group was significantly decreased in the presence of the Target (* indicates p<0.05) and a reduction in social interaction was observed, and that any change in SI time was not observed in the DSF diet group even in the presence of the Target.

The reduction in social interaction is considered as one of the depressive-like symptoms because the reduction in social interaction is reversed in SDS mice by chronic administration of an antidepressant drug (Golden S. A. et al., 2011, supra). Accordingly, DSF was suggested to have an antidepressant-like effect.

The invention claimed is:

1. A method for treating or ameliorating a psychiatric or neurological disorder or symptom, comprising administering to a subject any of the following (1) to (5) as an active ingredient, wherein the psychiatric or neurological disorder or symptom is a disorder or symptom selected from: anxiety disorder or anxiety symptom selected from separation anxiety, selective mutism, specific phobia, social anxiety disorder (social phobia), panic disorder, panic attack specifier, agoraphobia, generalized anxiety disorder, and substance/medication-induced anxiety disorder; depressive disorder or depressive symptom; and dementia other than Alzheimer's disease, or behavioral and psychological symptoms of dementia:

(1) disulfiram;

(2) a metal complex of diethyldithiocarbamate;

(3) a disulfide capable of generating diethyldithiocarbamate in the body;

(4) a pharmaceutically acceptable salt of (1), (2), or (3); and (5) a solvate of (1), (2), (3), or (4).

2. The method according to claim 1, wherein the metal complex is a complex of a divalent or higher valent metal.

3. The method according to claim 1, wherein the psychiatric or neurological disorder or symptom is an anxiety disorder or anxiety symptom selected from separation anxiety, selective mutism, specific phobia, social anxiety disorder (social phobia), panic disorder, panic attack specifier, agoraphobia, generalized anxiety disorder, and substance/medication-induced anxiety disorder.

4. The method according to claim 1, wherein the psychiatric or neurological disorder or symptom is depressive disorder or depressive symptom.

5. The method according to claim 1, wherein the psychiatric or neurological disorder or symptom is dementia other than Alzheimer's disease, or a behavioral and psychological symptom of dementia.

6. The method according to claim 1, wherein the depressive disorder or depressive symptom is a depressive disorder or depressive symptom other than a depressive symptom observed in substance-related and addictive disorders.

7. The method according to claim 2, wherein the psychiatric or neurological disorder or symptom is an anxiety disorder or anxiety symptom selected from separation anxiety, selective mutism, specific phobia, social anxiety disorder (social phobia), panic disorder, panic attack specifier, agoraphobia, generalized anxiety disorder, and substance/medication-induced anxiety disorder.

8. The method according to claim 2, wherein the psychiatric or neurological disorder or symptom is depressive disorder or depressive symptom.

9. The method according to claim 2, wherein the psychiatric or neurological disorder or symptom is dementia other than Alzheimer's disease, or a behavioral and psychological symptom of dementia.

10. The method according to claim 2, wherein the depressive disorder or depressive symptom is a depressive disorder or depressive symptom other than a depressive symptom observed in substance-related and addictive disorders.

11. The method according to claim 4, wherein the depressive disorder or depressive symptom is a depressive disorder or depressive symptom other than a depressive symptom observed in substance-related and addictive disorders.

12. The method according to claim 1, wherein the method is for ameliorating said psychiatric or neurological disorder or symptom.

* * * * *